(12) United States Patent
Ying et al.

(10) Patent No.: US 11,399,328 B2
(45) Date of Patent: *Jul. 26, 2022

(54) USER PLANE BEARER SETUP METHOD, APPARATUS, AND SYSTEM

(71) Applicant: HUAWEI TECHNOLOGIES CO., LTD., Guangdong (CN)

(72) Inventors: Jiangwei Ying, Beijing (CN); Xiaoyan Shi, Shenzhen (CN); Qiang Deng, Shenzhen (CN); Zhenglei Huang, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 61 days.

This patent is subject to a terminal disclaimer.

(21) Appl. No.: 17/098,908

(22) Filed: Nov. 16, 2020

(65) Prior Publication Data

US 2021/0068017 A1  Mar. 4, 2021

Related U.S. Application Data

(63) Continuation of application No. 16/213,107, filed on Dec. 7, 2018, now Pat. No. 10,869,242, which is a (Continued)

(30) Foreign Application Priority Data

Jun. 30, 2016  (WO) ................ PCT/CN2016/087971

(51) Int. Cl.
*H04W 36/12* (2009.01)
*H04W 36/00* (2009.01)
*H04W 36/38* (2009.01)

(52) U.S. Cl.
CPC ........ *H04W 36/12* (2013.01); *H04W 36/0011* (2013.01); *H04W 36/0022* (2013.01); *H04W 36/385* (2013.01)

(58) Field of Classification Search
CPC ............. H04W 36/12; H04W 36/0011; H04W 36/0022; H04W 36/385; H04W 88/16
See application file for complete search history.

(56) References Cited

U.S. PATENT DOCUMENTS 8,514,756 B1 * 8/2013 Ramachandra ....... H04W 76/40
370/310
9,232,544 B2  1/2016 Sundell et al.
(Continued)

FOREIGN PATENT DOCUMENTS

CN   102781068 A1   11/2012
CN   103546928 A1   1/2014
(Continued)

OTHER PUBLICATIONS

3GPP Evolved Packet System (EPS); Evolved General Packet Radio Service (GPRS) Tunnelling Protocol for Control plane (GTPv2-C);Stage 3 (3GPP TS 29.274 version 10.5.0 Release 1 0), Jan. 2012 (Year: 2012).
(Continued)

*Primary Examiner* — Tejis Daya
(74) *Attorney, Agent, or Firm* — Fish & Richardson P.C.

(57) ABSTRACT

The present disclosure relates to user plane bearer setup methods and devices to switch data from a control plane solution to a user plane solution. In one example method, a serving gateway receives indication information sent by a mobility management entity, and allocates an identifier to a bearer according to the indication information to set up an S1 interface user plane bearer.

20 Claims, 8 Drawing Sheets

Related U.S. Application Data continuation of application No. PCT/CN2016/087971, filed on Jun. 30, 2016.

(56) References Cited

U.S. PATENT DOCUMENTS

| | | | |
|---|---|---|---|
| 2011/0171953 | A1 | 7/2011 | Faccin et al. |
| 2011/0286465 | A1 | 11/2011 | Koodli et al. |
| 2012/0023360 | A1* | 1/2012 | Chang ............. G06F 11/0754 714/4.11 |
| 2012/0044949 | A1* | 2/2012 | Velev ............... H04W 8/082 370/401 |
| 2012/0239966 | A1 | 9/2012 | Kompella et al. |
| 2012/0258740 | A1* | 10/2012 | Mildh ............. H04M 15/70 455/456.4 |
| 2012/0269167 | A1 | 10/2012 | Velev et al. |
| 2013/0039337 | A1 | 2/2013 | Hwang et al. |
| 2013/0188601 | A1 | 7/2013 | Sun et al. |
| 2014/0003333 | A1 | 1/2014 | Ivershen et al. |
| 2014/0071945 | A1 | 3/2014 | Li |
| 2014/0219248 | A1 | 8/2014 | Reddiboyana et al. |
| 2015/0327327 | A1 | 11/2015 | Jain et al. |
| 2015/0351138 | A1 | 12/2015 | Metsala et al. |
| 2016/0006625 | A1 | 1/2016 | Javed et al. |
| 2019/0021130 | A1 | 1/2019 | Kim et al. |
| 2019/0104455 | A1 | 4/2019 | Park et al. |
| 2019/0104563 | A1 | 4/2019 | Olsson et al. |

FOREIGN PATENT DOCUMENTS

| | | |
|---|---|---|
| EP | 2934044 A1 | 10/2015 |
| WO | 2014109818 A1 | 7/2014 |
| WO | 2016011011 A1 | 1/2016 |
| WO | 2016059109 A2 | 4/2016 |
| WO | 2017126928 A1 | 7/2017 |

OTHER PUBLICATIONS

3GPP TS 23.401 V13.6.1 (Mar. 2016), 3rd Generation Partnership Project;Technical Specification Group Services and System Aspects;General Packet Radio Service (GPRS) enhancements for Evolved Universal Terrestrial Radio Access Network(E-UTRAN) access(Release 13), Mar. 2016. 365 pages.

3GPP TS 29.274 V13.5.0 (Mar. 2016), 3rd Generation Partnership Project;Technical Specification Group Core Network and Terminals;3GPP Evolved Packet System (EPS); Evolved General Packet Radio Service (GPRS) Tunnelling Protocol for Control plane (GTPv2-C); Stage 3(Release 13), Mar. 2016. 348 pages.

34-163086-Huawei, "Simultaneous support for CP and UP optimisation," 3GPP TSG CT4 Meeting #73, Osaka, Japan, May 23-27, 2016, 55 pages.

Extended European Search Report issued in European Application No. 16904393.2 dated Feb. 1, 2019, 15 pages.

International Search Report and Written Opinion issued in International Application No. PCT/CN2016/085315 dated Feb. 23, 2017, 11 pages.

International Search Report and Written Opinion issued in International Application No. PCT/CN2016/087971 dated Feb. 22, 2017, 17 pages.

Office Action issued in Chinese Application No. 201680086597.3 dated Jan. 7, 2020, 14 pages (with English translation).

Office Action issued in Japanese Application No. 2018-564320 dated Dec. 10, 2019, 9 pages (with English translation).

Qualcomm Incorporated, Nokia, "Simultaneous support for CP and UP optimization," 3GPP TSG-SA WG2 Meeting #114 S2-161518, Sections 5.3.4B.X and 5.3.2.1, Apr. 5, 2016, 32 pages.

S1 1-U tunneling for MO/MT data transport in control plane (SGi based)—with new S1 1-U F-TEI Ds Meeting #72 C4-1 61 145, Feb. 19, 2016 (Year: 2016).

S2-161932, Huawei, HiSilicon, SA2:"Introduction of S11-U TEID for Control Plane CIoT EPS optimization", 3GPP TSG SA WG2 Meeting #114, Apr. 11-15, 2016, Sophia Antipolis, France. XP051092122. 8 pages.

S2-162033, Nokia, SA2:"Alignment of S11-U procedures with stage 3", 3GPP TSG-SA2 Meeting #114, Sophia Antipolis, France, Apr. 11-15, 2016. XP051092009. 48 pages.

Search Report issued in Chinese Application No. 201680086597.3 dated Dec. 3, 2019, 3 pages.

Office Action issued in Indian Application No. 202118047404 dated May 18, 2022, 5 pages.

* cited by examiner

USER PLANE BEARER SETUP METHOD, APPARATUS, AND SYSTEM

CROSS-REFERENCE TO RELATED APPLICATIONS

This application is a continuation of U.S. patent application Ser. No. 16/213,107, filed on Dec. 7, 2018, which is a continuation of International Application No. PCT/CN2016/087971, filed on Jun. 30, 2016, which claims priority to International application No. PCT/CN2016/085315, filed on Jun. 8, 2016. All of the afore-mentioned patent applications are hereby incorporated by reference in their entireties.

TECHNICAL FIELD

Embodiments of the present invention relate to the communications field, and in particular, to a user plane bearer setup method and an apparatus in the communications field.

BACKGROUND

The 3rd Generation Partnership Project (3rd Generation Partnership Project, "3GPP" for short) is carrying out research on a Narrowband Internet of Things (NB-IoT) project. Some NB-IoT applications, for example, terminals such as a water meter, an electricity meter, and a sensor, send a very small amount of meter reading data or monitoring data mainly by using a network, or an intelligent street light receives a light switch-on/switch-off control instruction delivered by a network. Generally, an amount of data carried in a data packet during one transmission is only dozens of to hundreds of bytes.

In an existing Long Term Evolution (LTE) system, when a terminal in an idle mode needs to transmit data, the terminal needs to initiate a service request procedure to set up an air interface bearer and an S1 interface bearer before sending the data, even if only a small amount of data needs to be transmitted. In addition, Radio Resource Control (RRC) security context information needs to be downloaded to an evolved NodeB (eNodeB or eNB). However, before the small amount of data is transmitted, overheads brought by the bearer setup and a subsequent operation are very wasteful.

Therefore, to reduce the overheads, currently two solutions are designed to transmit the data in such an application scenario. One solution is a control plane solution (CP CIoT EPS Optimization). To be specific, these small data packets are transmitted to an MME by using NAS signaling between user equipment (UE) and the mobility management entity (MME), then the MME transmits the data to a serving gateway (S-GW) by using an S11-U bearer, and further the data is transmitted to a packet data network gateway (PDN gateway, P-GW). The other solution is a user plane solution (UP CIoT EPS Optimization). To be specific, UE transmits the data to an evolved NodeB (eNB) by using a radio bearer, the eNB transmits the data to an S-GW by using an S1-U bearer, and the data is further transmitted to a P-GW. This solution is special because the eNB stores an access stratum (AS) context of the UE to reduce air interface signaling exchange between the UE and the eNB.

However, data services of some NB-IoT applications are unstable. Sometimes a data packet is a small low-frequency packet, but sometimes a data packet is a small high-frequency packet or a large packet. In this case, use of the control plane solution brings some disadvantages, such as a load increase of the MME and an increase in NAS signaling exchange between the UE and the MME, while the user plane solution is more appropriate. Therefore, data transmission needs to be switched from the control plane solution to the user plane solution.

SUMMARY

A user plane bearer setup method and an apparatus provided in embodiments of the present invention can switch data from a control plane solution to a user plane solution.

According to a first aspect, an embodiment of this application provides a user plane bearer setup method. The method includes: receiving, by a serving gateway (S-GW), a first message from a mobility management entity (MME). The first message may be a modify bearer request message, or a modify access bearers request message, or a release access bearers request message.

The first message carries a first indication, and the first indication is used to instruct the S-GW to allocate a first identifier to a first evolved packet system (EPS) bearer of UE. The first identifier is used to set up a first S1 interface user plane bearer for the UE, the first S1 interface user plane bearer is a bearer between the S-GW and an eNB, and the first identifier may be specifically an S I-U S-GW F-TEID.

The S-GW allocates the first identifier to the first EPS bearer of the UE according to the first indication.

The S-GW sends a first response message to the MME. The first response message carries the first identifier. The first response message may be a modify bearer response message, or a modify access bearers response message, or a release access bearers response message.

In a possible design, the first message includes a first EPS bearer identity (EBI). The first EBI is used by the S-GW to allocate the first identifier to an EPS bearer corresponding to the first EBI.

In a possible design, the first message further includes a second identifier, the second identifier is used to set up a first S11 interface user plane bearer for the UE, and the first S11 interface user plane bearer is a bearer between the S-GW and the MME. For example, the second identifier may be an S11-U S-GW F-TEID.

In a possible design, the first message may be a release access bearers request, and the first response message corresponding to the first message may be a release access bearers response. Alternatively, the first message may be a create session request, and the first response message corresponding to the first message may be a create session response.

In a possible design, the S-GW stores a bearer context of the first EPS bearer of the UE.

In a possible design, the S-GW may determine that a value of a first parameter included in the first indication satisfies a preset condition, for example, may detect that a value of a Change F-TEID support Indication parameter satisfies a preset condition (for example, the value is 1) and a value of an S11-U Tunnel Flag parameter satisfies a preset condition (for example, the value is 0). When the preset condition is satisfied, the S-GW allocates the first identifier to the EPS bearer corresponding to the first EBI.

In a possible design, the S-GW allocates, to each EPS bearer of the UE according to the first indication, a first identifier corresponding to the EPS bearer. In this case, the S-GW stores a bearer context of each EPS bearer of the UE, and the S-GW does not require the MME to instruct, by using a message, the S-GW to allocate the first identifier based on a corresponding EPS bearer.

In a possible design, the MME may alternatively inform, by using a message, the S-GW of an EPS bearer of the UE to which the first identifier is to be allocated. For example, the MME may send, to the S-GW, a message carrying an EBI; and after receiving the message sent by the MME, the S-GW may determine, based on the EBI carried in the message, an EPS bearer of the UE to which the identifier is to be allocated.

In a possible design, the S-GW receives a second message from the MME, where the second message may also be a release access bearers request message, and the second message is used to instruct the S-GW to release an S11 interface data plane bearer between the MME and the S-GW;

the S-GW releases the S1 interface data plane bearer between the MME and the S-GW according to the second message; and the S-GW sends a second response message to the MME.

In a possible design, the S-GW may release each S11 interface data plane bearer.

In a possible design, the MME may alternatively inform, by using the second message, the S-GW of an S11 interface data plane bearer to be released. For example, the MME may send, to the S-GW, a message carrying an EBI; and after receiving the message sent by the MME, the S-GW may determine, based on the EBI carried in the message, an S11 interface data plane bearer to be released.

In a possible design, the second message may be a release access bearers request message.

In a possible design, after the S11 interface data plane bearer between the MME and the S-GW is released, the MME may determine to restore the released S11 interface data plane bearer.

In a possible design, the first response message further includes a second identifier. The second identifier may be an S11-U S-GW F-TEID. The S11-U S-GW F-TEID is used to set up an S11 interface user plane bearer for the UE. The S11 interface user plane bearer is a bearer between the S-GW and the MME.

According to another aspect, an embodiment of this application provides a user plane bearer setup method. The method includes: sending, by a mobility management entity (MME), a first message to a serving gateway (S-GW); where the first message may be the message described according to the first aspect, the first message carries a first indication, the first indication is used to instruct the S-GW to allocate a first identifier to a first evolved packet system (EPS) bearer of UE, the first identifier is used to set up a first S1 interface user plane bearer for the UE, and the first S1 interface user plane bearer is a bearer between the S-GW and an eNB; and receiving, by the MME, a first response message from the S-GW, where the first response message carries the first identifier.

In a possible design, the first message includes a first EPS bearer identity (EBI).

In a possible design, when determining that switching is needed from an S11 interface user plane bearer to an S1 interface user plane bearer, the MME sets a first parameter included in the first indication to a value that satisfies a preset condition; and the MME sends the first parameter to the S-GW. The first parameter may be determined by the MME. The MME may inform the S-GW by configuring a preset value of a Change F-TEID support Indication parameter and a preset value of an S11-U Tunnel Flag parameter. For example, when the value of the Change F-TEID support Indication parameter is set to 1 and the preset value of the S11-U Tunnel Flag parameter is 0, the S-GW allocates an identifier to an EPS bearer corresponding to an EBI.

In a possible design, the MME sends a second message to the S-GW where the second message is used to instruct the S-GW to release an S11 interface data plane bearer between the MME and the S-GW; and the MME receives a second response message from the S-GW. The second message may be a release access bearers request message.

In a possible design, after the S11 interface data plane bearer between the MME and the S-GW is released, the MME may determine to restore the released S11 interface data plane bearer.

In a possible design, the MME sends the first identifier to the eNB.

According to a third aspect, an embodiment of this application provides a serving gateway (S-GW). The S-GW has a function of implementing behavior of the S-GW in the foregoing method designs. The function may be implemented by hardware, or may be implemented by hardware executing corresponding software. The hardware or software includes one or more modules that correspond to the foregoing function.

In a possible design, a structure of the S-GW includes a processor and a transmitter/receiver. The processor is configured to support the S-GW in performing corresponding functions in the foregoing method, for example, allocate a first identifier to a first EPS bearer of UE according to a first indication. The transmitter/receiver is configured to support the S-GW in communicating with another network element, and send information or an instruction in the foregoing method to the another network element, for example, receive a first message from an MME and send a first response message to the MME. The S-GW may further include a memory. The memory is configured to couple with the processor and store a program instruction and data that are necessary for a base station.

According to a fourth aspect, an embodiment of this application provides a mobility management entity (MME). The MME has a function of implementing behavior of the MME in the foregoing method designs. The function may be implemented by hardware, or may be implemented by hardware executing corresponding software. The hardware or software includes one or more modules that correspond to the foregoing function.

In a possible design, a structure of the MME includes a processor and a transmitter/receiver. The processor is configured to support the MME in performing corresponding functions in the foregoing method, for example, configure indication information. The transmitter/receiver is configured to support the MME in communicating with another network element, and send information or an instruction in the foregoing method to another network element, for example, send indication information to an S-GW and receive a response message from the S-GW. The MME may further include a memory. The memory is configured to couple with the processor and store a program instruction and data that are necessary for a base station.

According to a fifth aspect, an embodiment of this application further provides a user plane bearer setup system. The system includes the S-GW and the MME according to the foregoing aspects; or the system includes other network entities according to the foregoing aspects.

According to a sixth aspect, an embodiment of the present invention provides a computer storage medium, configured to store a computer software instruction used by the foregoing S-GW. The computer storage medium includes a program designed to execute the foregoing aspects.

According to a seventh aspect, an embodiment of the present invention provides a computer storage medium, configured to store a computer software instruction used by the foregoing MME. The computer storage medium includes a program designed to execute the foregoing aspects.

Compared with the prior art, the embodiments of the present invention provide switching of data transmission from the control plane solution to the user plane solution.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art according to the embodiments of the present invention without creative efforts shall fall within the protection scope of the present invention.

The technical solutions described in the present invention may be applied to an evolved packet system (EPS) network architecture scenario, and may also be applied to an evolved system of the EPS, such as a fourth generation (4G) system or a fifth generation (5G) system. An EPS network system is used as an example in the embodiments.

It needs to be noted that, an EPS network architecture and a service scenario described in the embodiments of the present invention are intended to describe the technical solutions in the embodiments of the present invention more clearly but do not constitute a limitation on the technical solutions provided in the embodiments of the present invention. A person of ordinary skill in the art may learn that, with evolution of network architectures and emergence of new service scenarios, the technical solutions provided in the embodiments of the present invention are also applicable to similar technical problems.

In this application, the terms "network" and "system" are often used interchangeably, and a person skilled in the art may understand their meanings. User equipment UE in this application may include various handheld devices, in-vehicle devices, wearable devices, and computing devices having a wireless communications function, or another processing device connected to a wireless modem, and various forms of user equipment (UE), mobile stations (MS), terminals, terminal equipment, or the like. For ease of description, the devices mentioned above are collectively referred to as user equipment or UE in this application. A base station (BS) in the present invention is an apparatus deployed in a radio access network to provide the UE with a wireless communications function. The base station may include a macro base station, a micro base station, a relay station, an access point, and the like in various forms. A name of a device having a function of the base station may vary in systems using different radio access technologies. For example, the device is referred to as an evolved NodeB (eNB or eNodeB) in an LTE network, and referred to as a NodeB (NodeB) in a third generation 3G network.

Figure 1:
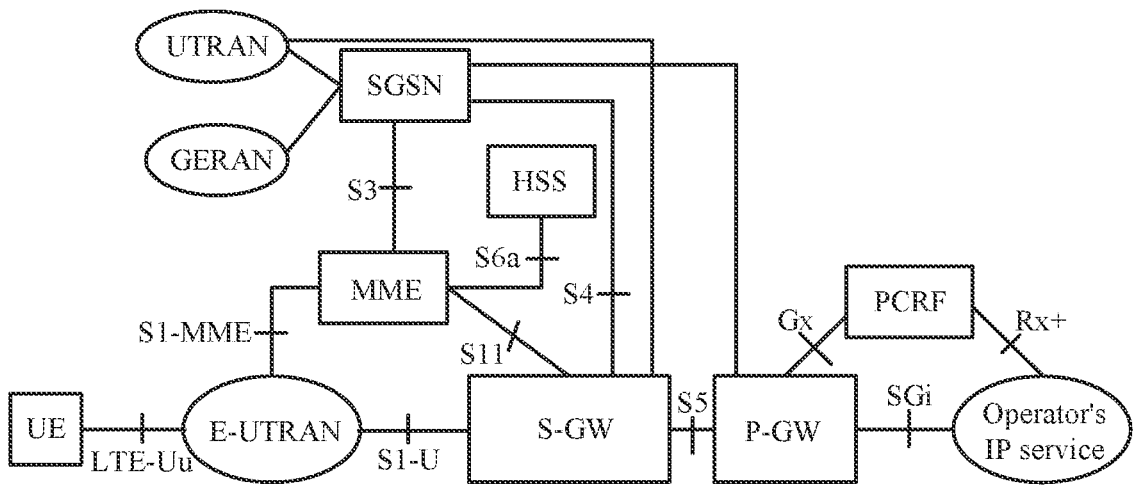
FIG. 1 is a schematic architectural diagram of an application scenario according to an embodiment of the present invention.

FIG. 1 shows an EPS network architecture according to an embodiment of the present invention. The EPS network architecture mainly includes a serving gateway (S-GW), a mobility management entity (MME), an evolved NodeB (eNB), and user equipment (UE). Relationships between network elements are specifically shown in FIG. 1.

An evolved universal terrestrial radio access network (EUTRAN) is a network including a plurality of eNodeBs. The eNodeB is connected to the S-GW through a user plane interface S1-U, and connected to the MME through a control plane interface S1-MME. The MME is mainly responsible for all control plane functions of user session management, including non-access stratum (NAS) signaling and security, tracking area management, packet data network gateway (PDN Gateway, P-GW; PDN, Packet Data Network) selection, S-GW selection, and the like. The S-GW is mainly responsible for data transmission, forwarding, route switching, and the like of the UE, and serves as a local mobility anchor point of the UE during handover of the UE between the eNodeBs. The P-GW is responsible for Internet Protocol (IP) address allocation for the UE, data packet filtering for a terminal, rate control, generation of billing information, and the like. In an NB-IoT scenario, the MME further establishes, with the S-GW, an S1-U user plane bearer on an S11 interface.

Figure 2:
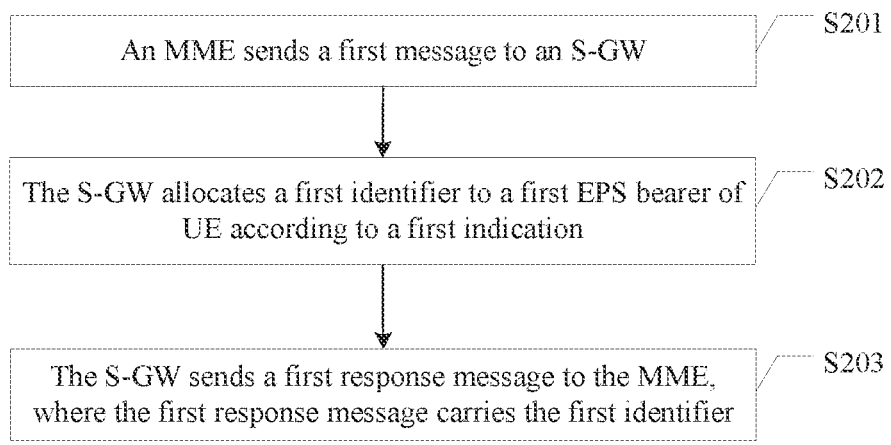
FIG. 2 is a schematic flowchart of user plane bearer setup according to an embodiment of the present invention.

FIG. 2 is a schematic flowchart of a systematic method for user plane bearer setup according to an embodiment of the present invention.

The system uses an EPS network architecture as an example, and the architecture includes major network elements, such as an S-GW, an MME, and an eNB. Main interaction processes in the technical solutions provided in this embodiment of the present invention are between the S-GW and the MME. User plane bearer setup and switching are implemented through creative processes between the S-GW and the MME. It may be understood that another network element may also perform corresponding cooperative steps to implement this embodiment of the present invention.

S201. The MME sends a first message to the S-GW, where the first message carries a first indication.

S202. The S-GW allocates a first identifier to a first EPS bearer of UE according to the first indication.

S203. The S-GW sends a first response message to the MME, where the first response message carries the first identifier.

FIG. 4 to FIG. 7 show specific implementations of this embodiment of the present invention. The following gives a detailed description with reference to the accompanying drawings.

Embodiment 1

Figure 4:
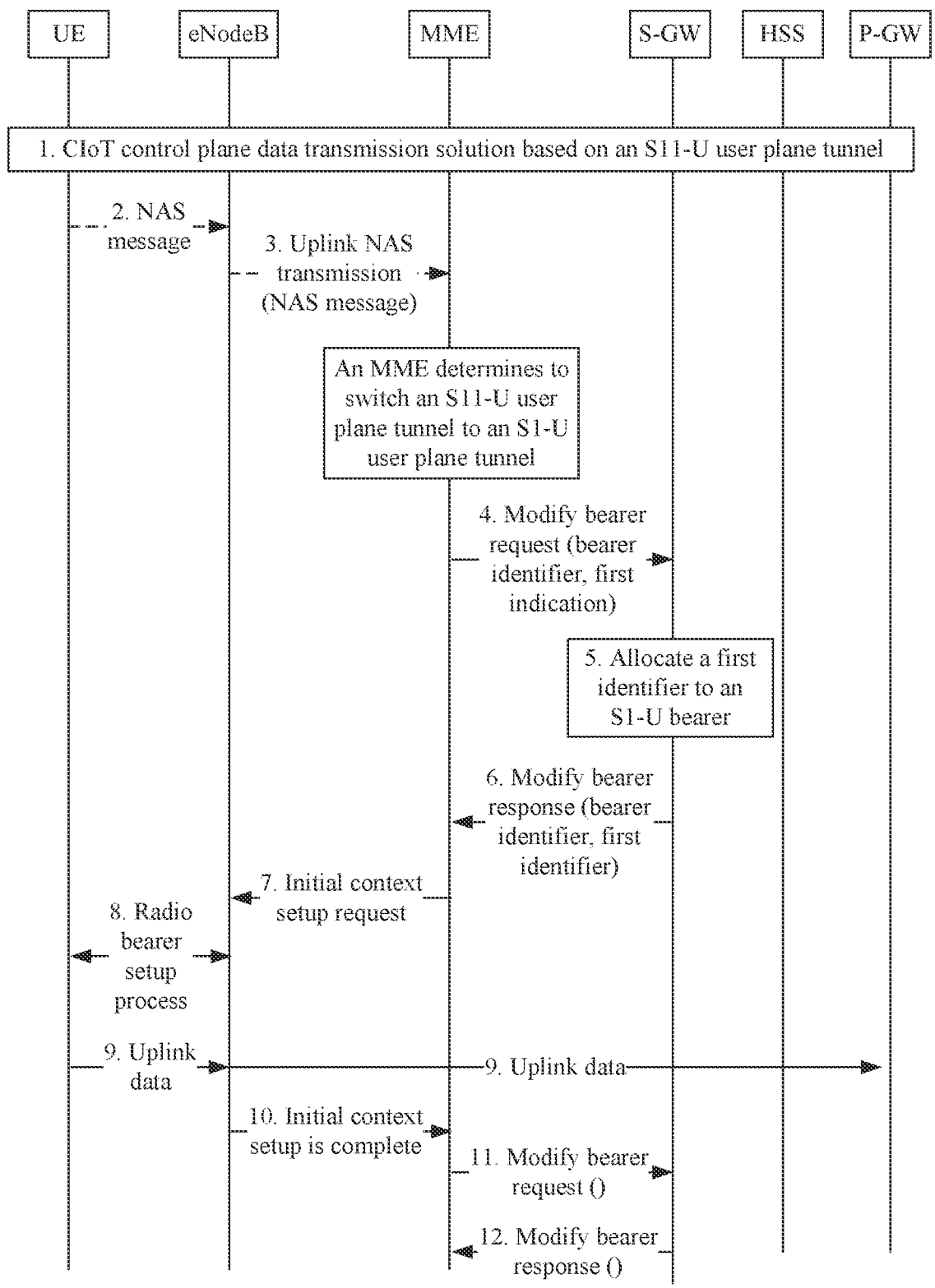
FIG. 4 is a schematic interaction flowchart of user plane bearer setup according to an embodiment of the present invention.

As shown in FIG. 4, an MME sends a first message to an S-GW. The first message may be a modify bearer request message or a modify access bearers request message.

The first message carries a first indication. The first indication may instruct the S-GW to allocate a first identifier to a first evolved packet system (EPS) bearer of UE. The first indication may be referred to as an S1-U S-GW F-TEIDs allocation indication or a CP transfer to UP indication, or another name, and no limitation is imposed herein.

The first identifier may be specifically an S1-U S-GW F-TEID. The identifier is used to set up a first S interface user plane bearer for the UE, and the first S interface user plane bearer is a bearer between the S-GW and an eNB.

Optionally, the first message further includes a first EPS bearer identity (EBI). The first EBI is used by the S-GW to allocate the first identifier to an EPS bearer corresponding to the first EBI.

Figure 10:
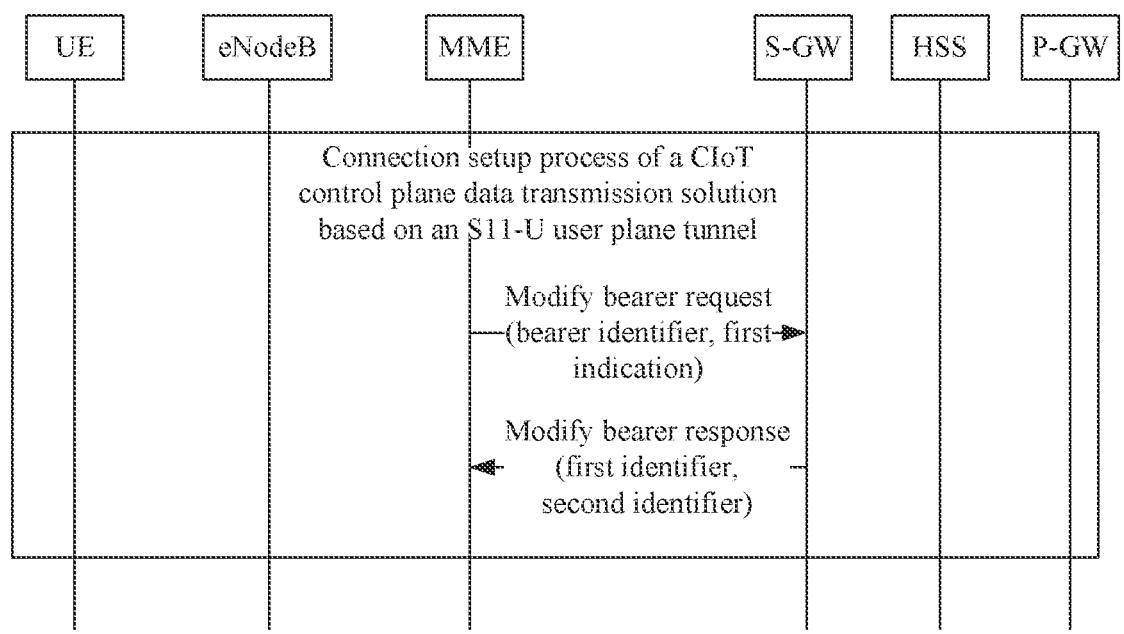
FIG. 10 is a schematic interaction flowchart of user plane bearer setup according to an embodiment of the present invention.

Optionally, as shown in FIG. 10, the process may be an S11-U user plane tunnel setup process of a CIoT control plane data transmission solution based on an S11-U user plane tunnel. The first indication may instruct the S-GW to allocate a second identifier to the first evolved packet system (EPS) bearer of the UE. The second identifier is used to set up a first S11 interface user plane bearer for the UE, and the first S1 interface user plane bearer is a bearer between the S-GW and the MME. For example, the second identifier may be an S11-U S-GW F-TEID. The S-GW further allocates the first identifier and the second identifier according to the first indication. The first identifier is used to set up the first S interface user plane bearer for the UE, and the first S interface user plane bearer is a bearer between the S-GW and the eNB. The S-GW returns the first identifier and the second identifier to the MME by using a first response message.

The S-GW allocates the first identifier to the first EPS bearer of the UE according to the first indication, as shown by step 5 in the process in FIG. 4.

Optionally, the S-GW allocates, to each EPS bearer of the UE according to the first indication, a first identifier corresponding to the EPS bearer. In this case, the S-GW stores a bearer context of each EPS bearer of the UE, and the S-GW does not require the MME to instruct, by using a message, the S-GW to allocate the first identifier based on a corresponding EPS bearer.

Optionally, the MME may alternatively inform, by using a message, the S-GW of an EPS bearer of the UE to which the first identifier is to be allocated. For example, the MME may send, to the S-GW, a message carrying an EBI; and after receiving the message sent by the MME, the S-GW may determine, based on the EBI carried in the message, an EPS bearer of the UE to which the identifier is to be allocated.

Optionally, the MME may inform the S-GW by configuring a preset value of a Change F-TEID support Indication parameter and a preset value of an S11-U Tunnel Flag parameter. For example, when a value of the Change F-TEID support Indication parameter is set to 1 and the preset value of the S11-U Tunnel Flag parameter is 0, the S-GW allocates an identifier to an EPS bearer corresponding to an EBI, specifically as shown by steps 7 to 9 in FIG. 7.

Optionally, if the first parameter includes S11-U Tunnel Flag, the MME sets a value of the S11-U Tunnel Flag parameter to 1; or if the first parameter is newly defined indication information that is used to indicate that a bearer corresponding to an EBI of the UE needs to be switched from an S1-U bearer to an S1-U bearer, the MME sets a value of the first parameter to 1.

It may be understood that meanings of values of the foregoing parameters may be manually set. For example, a piece of indication information may be newly defined to indicate that a bearer corresponding to an EBI of the UE needs to be switched from an S1-U bearer to an S1-U bearer. The MME sets that the value 1 of the first parameter satisfies a preset condition, to be specific, determines that switching is needed from the S11 interface user plane bearer to the S interface user plane bearer.

Optionally, the S-GW may further detect whether an identifier has been allocated to the bearer corresponding to the EBI. If an identifier has already been allocated, re-configuration is not needed.

The S-GW sends a first response message to the MME. The first response message carries the first identifier.

As shown in FIG. 4, the first response message may be a modify bearer response message or a modify access bearers response message.

Embodiment 2

Figure 5:
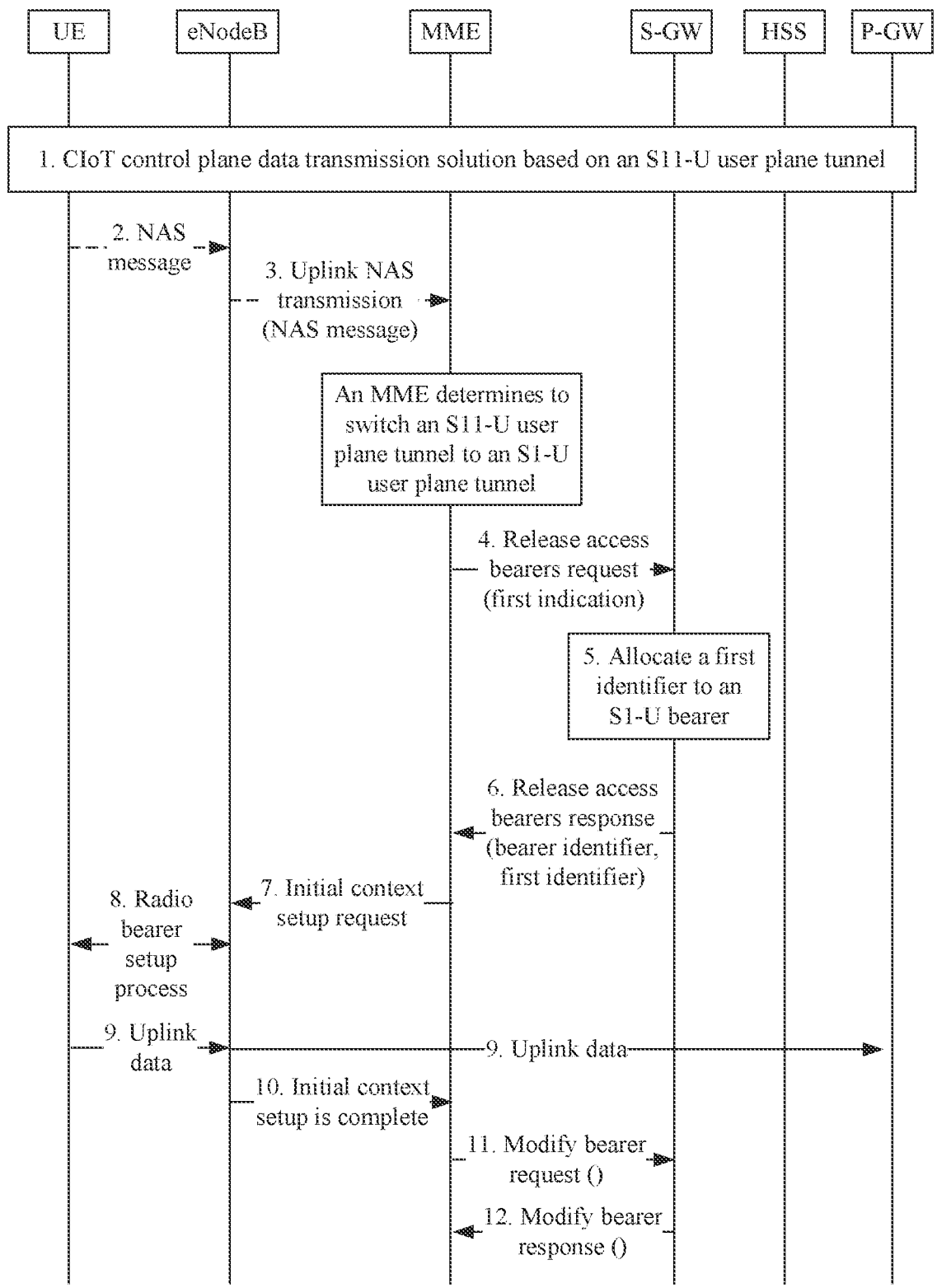
FIG. 5 is a schematic interaction flowchart of user plane bearer setup according to an embodiment of the present invention.

As shown in FIG. 5, for a specific implementation, refer to Embodiment 1. In the specific implementation, messages for information exchange between an MME and an S-GW in Embodiment 2 are different. Specifically, in this embodiment, a first message sent by the MME to the S-GW is a release access bearers request, and a first response message sent by the S-GW to the MME is a release access bearers response. For a specific implementation, refer to the description in Embodiment 1. Details are not described herein again.

Embodiment 3

S201 to S203 are a process in which an S interface user plane bearer is set up for UE, and a first S1 interface user plane bearer is a bearer between an S-GW and an eNB.

Figure 3:
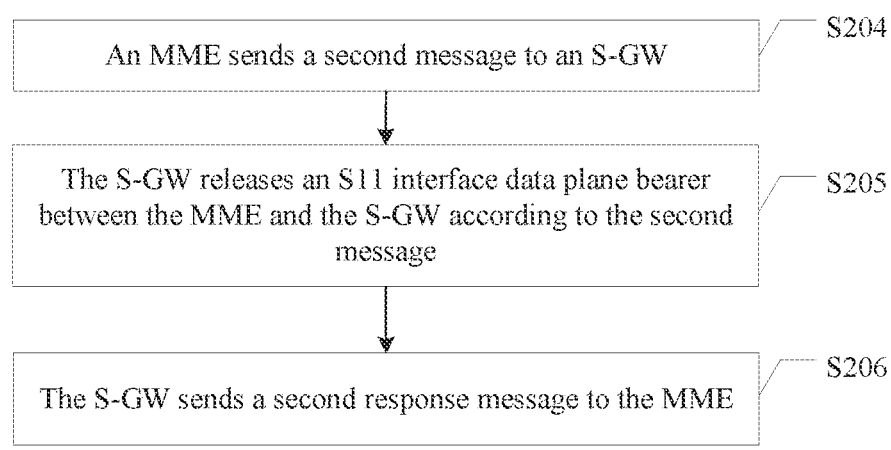
FIG. 3 is a schematic flowchart of user plane bearer setup according to an embodiment of the present invention.

Before the S1 interface user plane bearer of the UE is set up, optionally, an S11 interface data plane bearer between an MME and the S-GW may be released. For a detailed release process, refer to the description of S204 to S206 in FIG. 3.

S204. The MME sends a second message to the S-GW.

Figure 6:
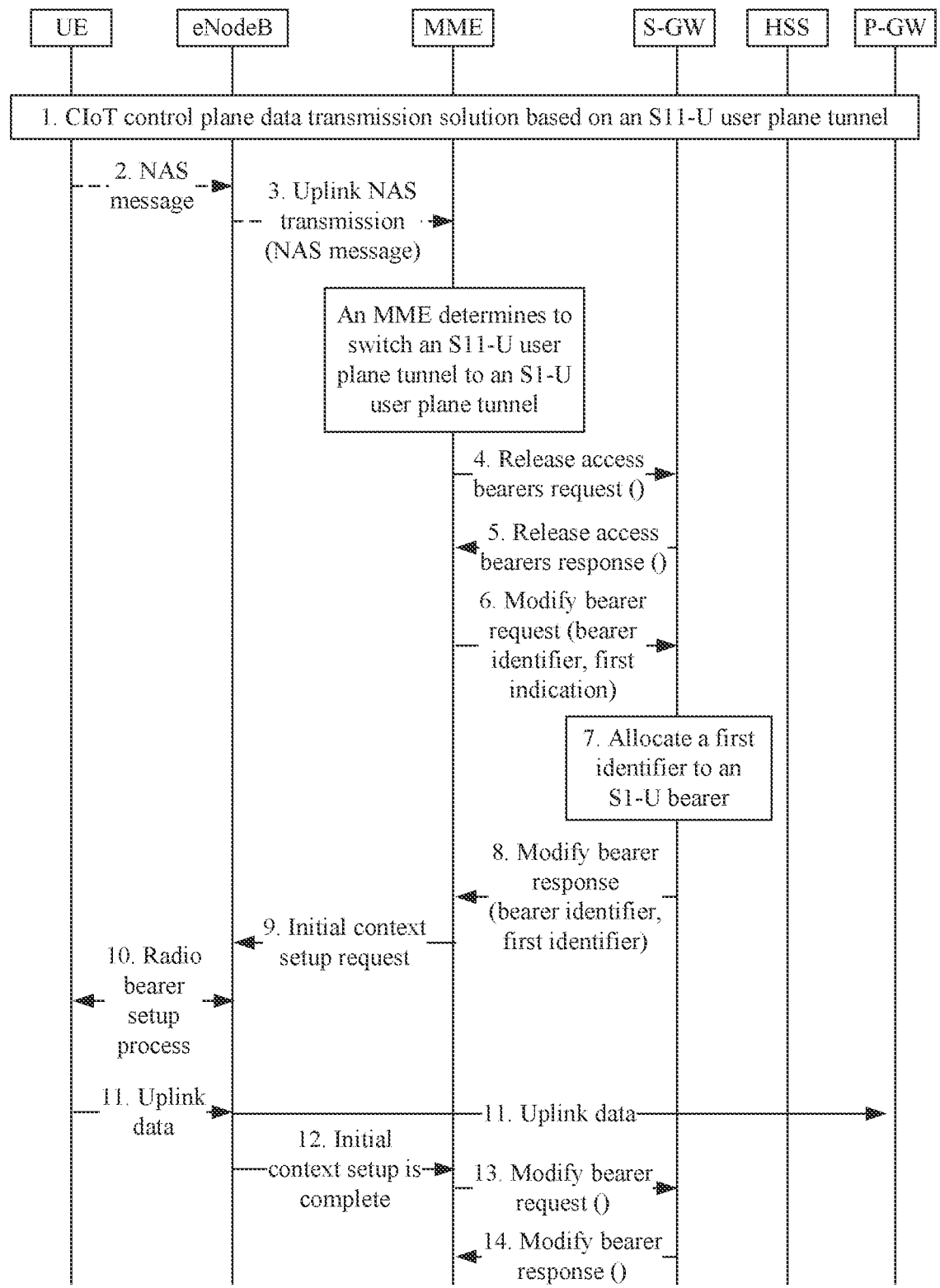
FIG. 6 is a schematic interaction flowchart of user plane bearer setup according to an embodiment of the present invention.
Figure 7:
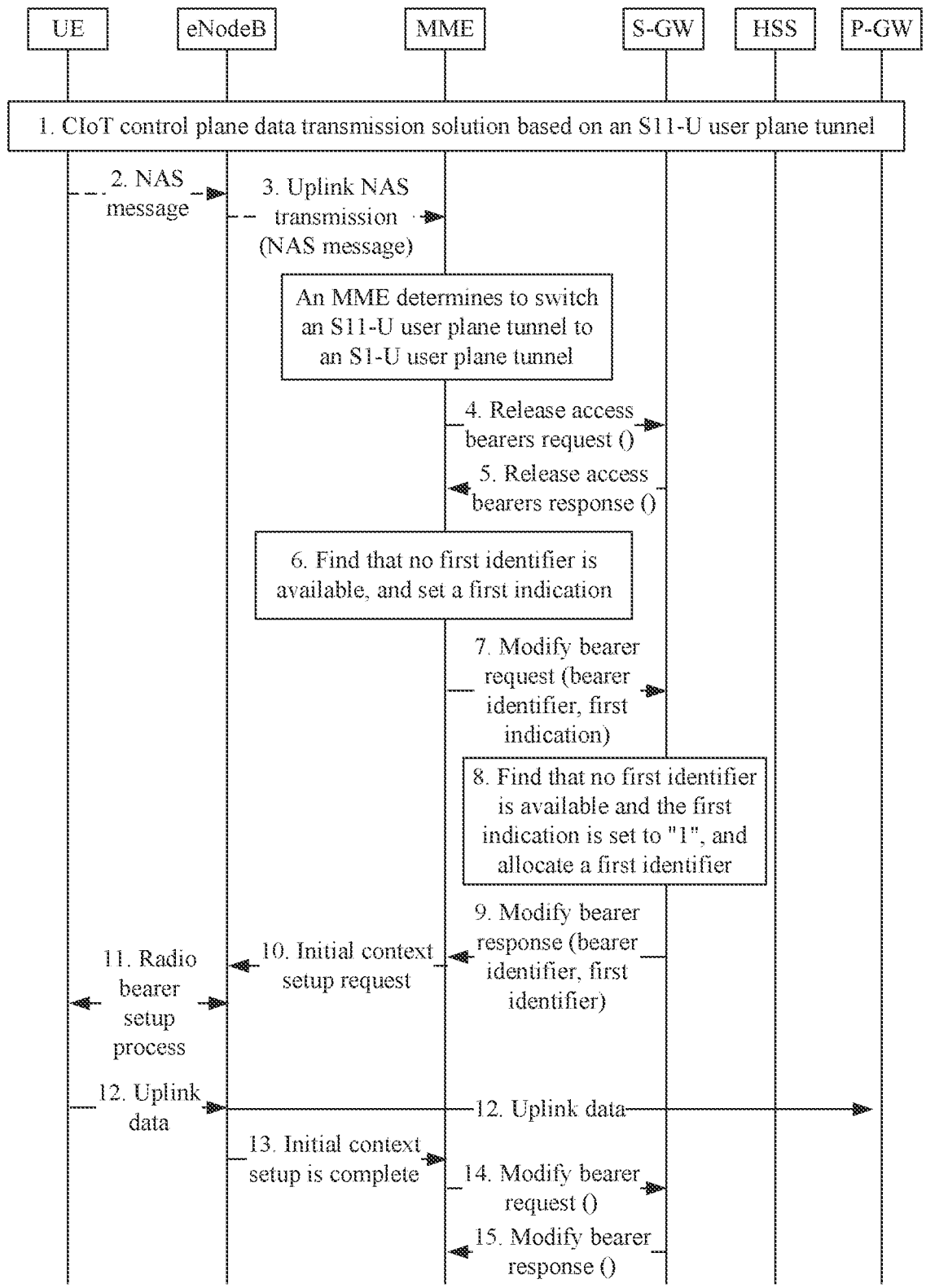
FIG. 7 is a schematic interaction flowchart of user plane bearer setup according to an embodiment of the present invention.

As shown in FIG. 6, the second message may be a release access bearers request message, and the second message is used to instruct the S-GW to release the S11 interface data plane bearer between the MME and the S-GW.

S205. The S-GW releases an S interface data plane bearer between the MME and the S-GW according to the second message.

Optionally, the S-GW may release each S11 interface data plane bearer.

Optionally, the MME may also inform, by using the second message, the S-GW of an S11 interface data plane bearer to be released. For example, the MME may send, to the S-GW, a message carrying an EBI; and after receiving the message sent by the MME, the S-GW may determine, based on the EBI carried in the message, an S11 interface data plane bearer to be released.

S206. The S-GW sends a second response message to the MME.

The second message may be a release access bearers response message.

Optionally, after the S11 interface data plane bearer between the MME and the S-GW is released, the MME may determine to restore the released S11 interface data plane bearer. For a specific implementation process, refer to the foregoing process of setting up an S1 interface user plane bearer. Details are not described herein again.

For a control plane solution, an S11-U bearer between the MME and the S-GW is set up; for a user plane solution, an S1-U bearer between the eNB and the S-GW is set up. Initially the UE uses the control plane solution, and the MME has only an S11-U S-GW F-TEID allocated by the S-GW to the S11-U bearer but has no S1-U S-GW F-TEID allocated to the S1-U bearer. Therefore, the MME cannot send a valid S1-U S-GW F-TEID to the eNB to set up the S1-U bearer. In other words, the control plane solution cannot be successfully switched into the user plane solution.

In the solution provided in this embodiment, the S1-U S-GW F-TEID of the S1-U bearer is obtained through interaction between the MME and the S-GW, and switching of data from the control plane solution to the user plane solution is implemented.

Figure 8:
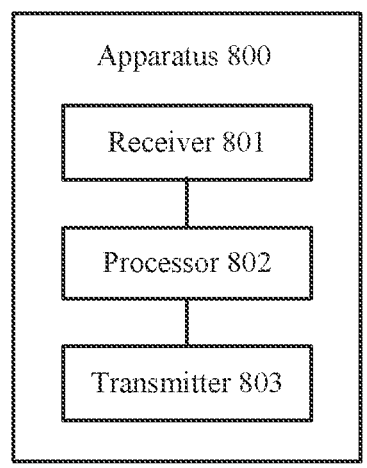
FIG. 8 is a schematic structural diagram of a serving gateway according to an embodiment of the present invention.

FIG. 8 is a possible schematic structural diagram of the S-GW according to the foregoing embodiments.

As shown in FIG. 8, an apparatus 800 is an S-GW, including a receiver 801, a controller/processor 802, and a transmitter 803. It may be understood that the receiver and the transmitter may be implemented as a same unit. The transmitter 801/receiver 803 is configured to support the S-GW in sending/receiving information to/from the MME according to the foregoing embodiments, and support the S-GW in communicating with another network element. The controller/processor 802 performs various functions used for communication with the MME.

For example, a receiver in an S-GW structure receives a first message from the MME. The first message carries a first indication. The first indication is used to instruct the S-GW to allocate a first identifier to a first evolved packet system (EPS) bearer of UE. The first identifier is used to set up a first S1 interface user plane bearer for the UE. The first S1 interface user plane bearer is a bearer between the S-GW and an eNB.

The processor allocates the first identifier to the first EPS bearer of the UE according to the first indication.

The transmitter sends a first response message to the MME. The first response message carries the first identifier.

The controller/processor 802 further performs a processing process related to the S-GW in FIG. 4 to FIG. 7 and/or performs other processes of the technology described in this application. The apparatus 800 may further include a memory, configured to store program code and data of a base station.

It may be understood that FIG. 8 merely shows a simplified design of the S-GW. During actual application, the base station may include any quantity of transmitters, receivers, processors, controllers, memories, communications units, or the like, and all base stations that can implement the present invention fall within the protection scope of the present invention.

Figure 9:
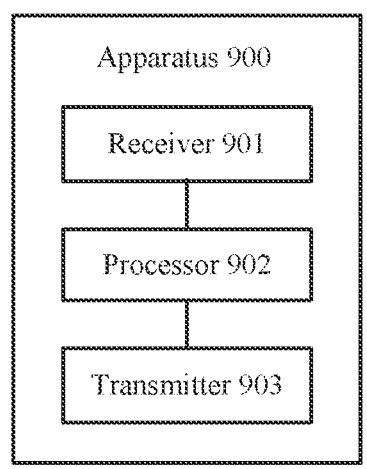
FIG. 9 is a schematic structural diagram of a mobility management entity according to an embodiment of the present invention.

FIG. 9 is a simplified schematic diagram of a possible design structure of the MME according to the foregoing embodiments. The MME includes a receiver 901, a controller/processor 902, and a transmitter 903.

The transmitter 903 outputs an indication signal. The indication signal is used by an S-GW to configure a first identifier for an S1-U bearer. The first identifier is used to set up a first S1 interface user plane bearer for the UE. The first S1 interface user plane bearer is a bearer between the S-GW and an eNB. Specifically, the transmitter 903 may implement steps that are implemented by the MME in the foregoing embodiments.

The receiver 901 receives a response message sent by the S-GW, and specifically may implement steps that are implemented by the MME in the foregoing embodiments.

The controller/processor 902 controls and manages actions of the MME, and is configured to perform processing that is performed by the MME in the foregoing embodiments. For example, the controller/processor 902 is configured to configure a parameter of indication information, so that the S-GW performs an action according to the indication information and/or performs other processes of the technology described in the present invention. In an example, the controller/processor 902 is configured to support the MME in performing a processing process related to the MME in FIG. 4 to FIG. 7 and/or perform other processes of the technology described in this application. The apparatus 900 may further include a memory, configured to store program code and data of a base station.

The controller/processor configured to perform a function of a network element such as the S-GW or the MME in the present invention may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual requirements to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A mobility management entity, comprising:
   a transmitter, the transmitter configured to send a first message to a serving gateway (S-GW), wherein the first message carries a first indication, wherein the first indication instructs the S-GW to allocate a first identifier and a second identifier to a first evolved packet system (EPS) bearer of user equipment (UE), wherein the first identifier is used to set up a first S1 interface user plane bearer for the UE, wherein the first S interface user plane bearer is a bearer between the S-GW and an evolved NodeB (eNB), wherein the second identifier is used to set up a first S1 interface user plane bearer for the UE, and wherein the first S11 interface user plane bearer is a bearer between the S-GW and the mobility management entity; and
   a receiver, the receiver configured to receive a first response message from the S-GW, wherein the first response message carries the first identifier and the second identifier.

2. The mobility management entity according to claim 1, wherein the first message comprises a first EPS bearer identity (EBI), and wherein the first EBI is used by the S-GW to allocate the first identifier to an EPS bearer corresponding to the first EBI.

3. The mobility management entity according to claim 1, wherein:
   the first message is a create session request; and
   the first response message is a create session response.

4. The mobility management entity according to claim 1, further comprising at least one processor, the at least one processor configured to:
   in response to determining that switching is needed from an S11 interface user plane bearer to an S1 interface user plane bearer, set a first parameter comprised in the first indication to a value that satisfies a preset condition; and
   wherein the transmitter is configured to send the first parameter to the S-GW.

5. The mobility management entity according to claim 1, wherein the second identifier comprises S11-U SGW F-TEID.

6. A communication method performed in a mobility management entity (MME), comprising:
   sending a first message to a serving gateway (S-GW), wherein the first message carries a first indication, wherein the first indication instructs the S-GW to allocate a first identifier and a second identifier to a first evolved packet system (EPS) bearer of user equipment (UE), wherein the first identifier is used to set up a first S1 interface user plane bearer for the UE, wherein the first S1 interface user plane bearer is a bearer between the S-GW and an evolved NodeB (eNB), wherein the second identifier is used to set up a first S11 interface user plane bearer for the UE, and wherein the first S11 interface user plane bearer is a bearer between the S-GW and the MME; and
   receiving a first response message from the S-GW, wherein the first response message carries the first identifier and the second identifier.

7. The communication method according to claim 6, wherein the first message comprises a first EPS bearer identity (EBI), and wherein the first EBI is used by the S-GW to allocate the first identifier to an EPS bearer corresponding to the first EBI.

8. The communication method according to claim 6, wherein:
   the first message is a create session request; and
   the first response message is a create session response.

9. The communication method according to claim 6, further comprising:
   in response to determining that switching is needed from an S11 interface user plane bearer to an S1 interface user plane bearer, setting a first parameter comprised in the first indication to a value that satisfies a preset condition; and
   sending the first parameter to the S-GW.

10. The communication method according to claim 9, wherein the second identifier comprises S11-U SGW F-TEID.

11. A communication system, comprising a mobility management entity and a serving gateway;
wherein the mobility management entity is configured to:
send a first message to the serving gateway, wherein the first message carries a first indication, wherein the first indication instructs the serving gateway to allocate a first identifier and a second identifier to a first evolved packet system (EPS) bearer of user equipment (UE), wherein the first identifier is used to set up a first S1 interface user plane bearer for the UE, wherein the first S1 interface user plane bearer is a bearer between the serving gateway and an evolved NodeB (eNB), wherein the second identifier is used to set up a first S11 interface user plane bearer for the UE, and wherein the first S11 interface user plane bearer is a bearer between the serving gateway and the mobility management entity; and
wherein the serving gateway is configured to:
allocate the first identifier and the second identifier to the first EPS bearer of the UE according to the first indication; and
send a first response message to the mobility management entity, wherein the first response message carries the first identifier and the second identifier.

12. The communication system according to claim 11, wherein the first message comprises a first EPS bearer identity (EBI), and wherein the first EBI is used by the serving gateway to allocate the first identifier to an EPS bearer corresponding to the first EBI.

13. The communication system according to claim 12, wherein the serving gateway is configured to allocate the first identifier to the EPS bearer corresponding to the first EBI in response to determining that a value of a first parameter comprised in the first indication satisfies a preset condition.

14. The communication system according to claim 11, wherein:
the first message is a create session request; and
the first response message is a create session response.

15. The communication system according to claim 11, wherein the second identifier comprises S11-U SGW F-TEID.

16. A communication method, comprising:
sending, by a mobility management entity, a first message to a serving gateway, wherein the first message carries a first indication, wherein the first indication instructs the serving gateway to allocate a first identifier and a second identifier to a first evolved packet system (EPS) bearer of user equipment (UE), wherein the first identifier is used to set up a first S1 interface user plane bearer for the UE, wherein the first S1 interface user plane bearer is a bearer between the serving gateway and an evolved NodeB (eNB), wherein the second identifier is used to set up a first S11 interface user plane bearer for the UE, and wherein the first S11 interface user plane bearer is a bearer between the serving gateway and the mobility management entity;
receiving, by the serving gateway, the first message from the mobility management entity;
allocating, by the serving gateway, the first identifier and the second identifier to the first EPS bearer of the UE according to the first indication;
sending, by the serving gateway, a first response message to the mobility management entity, wherein the first response message carries the first identifier and the second identifier; and
receiving the first response message from the serving gateway.

17. The communication method according to claim 16, wherein the first message comprises a first EPS bearer identity (EBI), and wherein the first EBI is used by the serving gateway to allocate the first identifier to an EPS bearer corresponding to the first EBI.

18. The communication method according to claim 17, comprising:
allocating, by the serving gateway, the first identifier to the EPS bearer corresponding to the first EBI in response to determining that a value of a first parameter comprised in the first indication satisfies a preset condition.

19. The communication method according to claim 16, wherein:
the first message is a create session request; and
the first response message is a create session response.

20. The communication method according to claim 16, wherein the second identifier comprises S11-U SGW F-TEID.

* * * * *

UNITED STATES PATENT AND TRADEMARK OFFICE
CERTIFICATE OF CORRECTION

PATENT NO. : 11,399,328 B2
APPLICATION NO. : 17/098908
DATED : July 26, 2022
INVENTOR(S) : Jiangwei Ying et al.

It is certified that error appears in the above-identified patent and that said Letters Patent is hereby corrected as shown below:

On the Title Page

Item (30) Foreign Application Priority Data, delete "Jun. 30, 2016 (WO) ...PCT/CN2016/087971" and insert -- Jun. 8, 2016 (WO) ... PCT/CN2016/085315 --.

In the Claims

In Column 11, Line 66, in Claim 1, delete "S" and insert -- S1 --.

In Column 12, Line 2, in Claim 1, delete "S1" and insert -- S11 --.

Signed and Sealed this
Eleventh Day of April, 2023

Katherine Kelly Vidal
*Director of the United States Patent and Trademark Office*